United States Patent
Forsythe et al.

(12) 
(10) Patent No.: US 6,338,296 B1
(45) Date of Patent: *Jan. 15, 2002

(54) RELEASE DEVICE FOR SLOWLY RELEASING SPROUT INHIBITOR INTO PACKAGES OF POTATOES

(76) Inventors: Darol Forsythe, 15401 Cartwright Rd., Boise, ID (US) 83703; John M. Forsythe, 4277 Balivi La., Nampa, ID (US) 83687

( * ) Notice: Subject to any disclaimer, the term of this patent is extended or adjusted under 35 U.S.C. 154(b) by 0 days.

This patent is subject to a terminal disclaimer.

(21) Appl. No.: 09/347,181

(22) Filed: Jul. 2, 1999

Related U.S. Application Data

(63) Continuation-in-part of application No. 08/897,997, filed on Jul. 25, 1997, now Pat. No. 5,918,537.
(60) Provisional application No. 60/022,672, filed on Jul. 26, 1996.

(51) Int. Cl.[7] .......................... A23B 7/00; A01N 47/20; A01N 37/10
(52) U.S. Cl. .............................. 99/467; 99/473; 239/60; 239/34; 426/312; 426/316; 504/143; 504/304; 504/324

(58) Field of Search .................... 99/467, 473, 482; 426/419, 316, 312, 124, 302, 309, 442; 206/7, 5, 6; 239/60, 34, 327, 145; 504/143, 144, 304, 324, 138; 118/300, 301, 303

(56) References Cited

U.S. PATENT DOCUMENTS

| | | | | |
|---|---|---|---|---|
| 5,009,152 A | * | 4/1991 | Morgan | 99/476 |
| 5,622,912 A | * | 4/1997 | Riggle et al. | 504/143 |
| 5,635,452 A | * | 6/1997 | Lulai et al. | 504/324 |
| 5,711,211 A | * | 1/1998 | Ide et al. | 99/467 |

* cited by examiner

Primary Examiner—Reginald L. Alexander
(74) Attorney, Agent, or Firm—TraskBritt

(57) ABSTRACT

A release device for slowly releasing vapors of a sprout inhibitor into a small package of potatoes is disclosed. The release device includes a container for holding finely particulate porous media which has absorbed a liquid sprout inhibitor. The container is at least partially porous with respect to sprout inhibitor vapors such that the release device may be utilized to inhibit sprouting of potatoes in small packages during shipments. The release device may further be structured to be coated to control the release rate and may further include being printed upon a porous substrate.

13 Claims, 2 Drawing Sheets

RELEASE DEVICE FOR SLOWLY RELEASING SPROUT INHIBITOR INTO PACKAGES OF POTATOES

PRIORITY CLAIM

Under the provisions of 35 U.S.C. §1.19(e), this application claims priority of Provisional Patent Application Ser. No. 60/022,672, filed Jul. 26, 1996 and U.S. patent application Ser. No. 08/897,997, filed Jul. 25, 1997 now U.S. Pat. No. 5,918,537, and is a continuation-in-part of said latter application.

BACKGROUND OF THE INVENTION

1. Field of the Invention

This invention relates to release devices for releasing a chemical vapor into a space over an extended period of time.

2. State of the Art

Treatment of storage facilities with chemicals of various types has been practiced in various agricultural businesses. The treatment may be with chemical vapors, dusts, powders or the like, such as the treatment of potato storage facilities with sprout inhibiting chemicals.

Considerable study and innovation have been directed towards inhibition of potato sprouting during storage in large storage facilities. U.S. Patents to Hitchcock et al., U.S. Pat. No. 2,341,868; Luck, U.S. Pat. No. 4,078,480; Vaughn, et al., U.S. Pat. No. 5,129,951; Morgan, U.S. Pat. No. 4,887,525; and Plant, U.S. Pat. No. 3,128,170 describe various treatments to prevent sprouting in storage facilities.

Potatoes when being dug are frequently bruised, cut and/or abraded. These injuries to the potatoes oftentimes cause spoilage during shipment, storage and the like. A process known as suberization occurs naturally which tends to heal many of these injuries. However, whenever potatoes are stored, which occurs with a particularly large portion of potatoes harvested in any given year, if healing occurs slowly, a significant loss of potatoes can occur through spoilage. Early treatment with certain sprout inhibitors, such as CIPC, may retard the suberization process, thus contributing to the loss of potatoes through spoilage.

For example, it is relatively common in the potato storage industry to treat potatoes with Chloroisopropyl-N-carbamate (CIPC) to prevent or retard development of sprouts in the potatoes. Even though untreated potatoes are stored at a cool temperature, for example, generally between about 40° and 45° F., sprouting does begin to occur after a month or more of storage. Storage of upwards of six to eight months is typical for a stored potato harvest. Thus, without treatment of a chemical such as CIPC, the stored potatoes become entangled in sprouts and the whole stored lot of potatoes may become economically useless. Although early treatment with CIPC could be advantageous for sprout inhibition purposes, application of CIPC is typically delayed until after suberization has occurred inasmuch as CIPC tends to retard suberization, resulting in accelerated rot and spoilage.

Testing of isomers of dimethyl naphthalene (DMN) as a potential sprout inhibitor was conducted by placing alumina particles containing DMN in a box of potatoes stored at 10±0.5° C. in a ventilated cooler for a period of 12 weeks. The potatoes evidenced sprout inhibition in comparison with a control batch, i.e., in an untreated batch, and with a batch treated with Tecnazene, a commercial sprout inhibitor. Beveridge, et al., *The Assessment of Some Volatile Organic Compounds as Sprout Suppressants for Ware and Seed Potatoes, Potato Res.* 24 (1981) 61–76 and Beveridge, et al., *Dimethyl Naphthalene as a Sprout Suppressant for Ware and See Potatoes, Potato Res.*, 24 (1981) 77–88.

The use of DMN treatment in a large storage facility has also been proposed. In PCT application PCT/GB92/01482 (Int'l. Pub. No. WO 93102563) of Everett-Todd, a system for monitoring the vapor pressure of alkyl naphthalenes is disclosed wherein alkyl naphthalenes are added to the facility when the monitored vapor pressure of alkyl naphthalenes falls below a certain value, e.g., 5 mg of alkyl naphthalene per cubic meter of storage free space.

While considerable effort has been devoted to sprout prevention of potatoes stored in larger facilities, little or no effort has been devoted to prevention of sprouting of potatoes during shipment. Freshly-dug and stored potatoes are shipped to commercial markets, e.g., restaurants and the like, and to consumer markets, e.g., retail grocery stores, in refrigerated trailers and railroad cars. No other particular effort has been made to inhibit sprouting during the shipping and distribution process.

SUMMARY OF THE INVENTION

The instant invention relates to release devices which are structured to release slowly vapors of a sprout inhibiting chemical into small packages of potatoes during shipment or storage. The device includes a quantity of porous media, i.e., a carrier, containing a significant amount of a potato sprout inhibitor, particularly a sprout inhibitor which is liquid at room temperature. The porous media is preferably a very fine particulate, inorganic material such as silica gel having a very high surface area per unit volume. The porous media is confined by containment means which is at least partially porous or permeable to vapors of the sprout inhibitor. Containment means may be made of any suitable material such as paper, cardboard, plastic, metal or fabric. It may be either rigid, semi-rigid or flexible. A suitable container may be in the form of a small canister or pouch or other convenient shape and form for holding a significant quantity of the sprout-inhibitor-treated, porous media.

The release device may further be structured wherein a removable or breachable seal means encloses at least that part of the containment means which is porous or permeable. The seal means may be a plastic film or membrane which is substantially impermeable to the sprout inhibitor vapors. It could also be a metal tab that is sealed to a portion of the containment means so that removal of the tab exposes a porous region of the containment means.

The release device of the instant invention is intended particularly for packaged potatoes which are packaged in plastic bags, net bags, fabric bags, cardboard boxes or similar small containers. Potatoes generally having a weight of 5, 10, 25, 50 or 100 pounds or less are so packaged. While significant attention has been given to the treatment of potatoes in large storage facilities to prevent sprouting, little attention has been given generally to the problem of sprout inhibition of potatoes stored in small packages or shipped in small packages.

While very large volumes of freshly-dug potatoes are sent to storage sheds for long-term storage, which is generally in excess of several months, a significant portion of a freshly-dug crop of potatoes may be directly placed into boxes or packages for prompt shipment to market. These boxes or packages may be stored for short periods of time before being shipped and during the shipping process from the farm to consumer. For example, distribution centers may store potatoes for a period of days or weeks after receipt of the packaged potatoes from various producers. Also, potatoes which are removed from large storage facilities are packaged in smaller packages generally referred to as "fresh packs" for ultimate sale to consumers.

Even though potatoes at a storage facility may have been treated with sprout inhibitor, the sprout inhibitor application in such a storage facility is at a level to prevent sprouting at relatively low temperatures, that is, at preferred storage temperatures of about 40° or 45° F. or slightly elevated therefrom. Upon shipment of potatoes in small packages, temperature control may be irregular. For example, shipment of freshly-dug potatoes in the early fall via truck, rail car and the like may result in the potatoes experiencing temperatures in excess of 80° F. or more while being loaded, unloaded, etc., even when temperature control is a feature of each shipple vehicle. Since the potatoes are respiring and generating heat, the temperature within a confined railroad car or enclosed trailer may greatly exceed optimum storage temperatures. Thus, inhibition of sprouting during shipment is very desirable since sprouting is accelerated by temperatures above the optimum storage temperatures of 40°–45° F.

The release devices of the instant invention are intended to be utilized with potatoes in ventilated packages. Potatoes packaged for shipment to consumers generally are placed in plastic bags with holes, mesh bags or in boxes with ventilation holes. These holes are necessary to provide ventilation to prevent excess humidity buildup and to allow the potatoes to "breathe." As indicated, potatoes, even after long-term storage, respire and produce materials which preferably are allowed to escape, for example, carbon dioxide and moisture. Also, the ventilation is desirable to preclude excessive buildup of heat.

As indicated hereinabove, the sprout-inhibitor release device comprises a container for holding a porous media, especially a particulate media, substantially saturated with a liquid potato sprout inhibitor. The container may be either totally porous or permeable, wherein the pores are sufficiently small such that very fine inorganic, particulate media does not escape. The container porosity is such as to allow the vapors to escape at a rate sufficient to provide a significant vapor pressure of the sprout inhibitor in the package of potatoes. The release devices may be constructed in various sizes so that one size is appropriate for a five-pound package of potatoes and another device twice as large for a ten-pound package of potatoes and so forth. Alternatively, the release device could be in one size, that is, a size suitable for a five-pound package of potatoes with multiple release devices placed in larger packages.

Generally, it is very desirable that the particulate media not be permitted to become loose in a package inasmuch as it could be lost through the ventilation holes during handling. Also, it could become stuck to potatoes and inadvertently ingested by a consumer. Thus, the containment means must have sufficient integrity and strength to endure the handling of packages going into storage, out of storage, into and out of transportation vehicles, into and out of warehouses, into retail stores and into the consumer's home.

Generally, for the purposes of the instant invention, particulate media which is a silica material is preferred. Materials such as silica gel have a very high adsorption/absorption capacity for liquid sprout inhibitors. For example, significant quantities of an isomer of DMN (dimethyl naphthalene) may be readily absorbed upon silica gel. Also, the silica gel permits the release of vapors of DMN, for example, at a fairly predictable rate. Other inorganic materials such as diatomaceous earth, feldspar, zeolites and porous clays and other inert, porous materials may be suitable as an inorganic particulate media.

Preferred sprout inhibitors are isomers of dimethyl naphthalene with 1,4-dimethyl naphthalene being especially preferred. The 1,4-DMN isomer is a very effective sprout inhibitor and is readily absorbed by silica gel. The 1,4-isomer of DMN is also a volatile component of potatoes and is released by potatoes during storage. Provision of an increased vapor pressure of DMN in ventilated packages of potatoes during storage and shipment is desirable in precluding the sprouting of the potatoes. Also, 1,4-DMN is generally not toxic to human beings and is not otherwise detrimental to the potatoes. This is an important factor inasmuch as the release devices of the instant invention are contemplated as being used with freshly-dug potatoes. While some sprout inhibitors such as CIPC may retard the suberization or healing process of wounds, abrasions, etc. which potatoes experience during harvesting, 1,4-DMN appears to promote the suberization process.

The release devices of the invention may be provided with a sealing means although the release devices may be advantageously used without such sealing means. For example, release devices without sealing means may be placed in large numbers in a large can, which is then sealed and placed in a refrigerated area to reduce significantly the vapor pressure of the sprout inhibitor. Stored in this fashion, the release devices lose very little, if any, sprout inhibitor through vaporization. When the release devices are to be put into packages of potatoes, the large container may be removed from the refrigerated area and brought to a packaging process site, and the release devices immediately placed into packages of potatoes.

If the release devices are provided with seal means, then the release devices, after manufacture, would not need to be stored in any protective fashion which limits either vapor pressure or loss of vapors of the sprout inhibitor. Sealed devices could be stored at ambient conditions. Sealed release devices have the seal means removed or compromised when the release device is placed into a package of potatoes to permit vapors emanating from the porous media to escape into the package to initiate sprout inhibition.

Further understanding of the invention may be facilitated by reference to the attached drawings.

DETAILED DESCRIPTION OF THE INVENTION

Various types and configurations of release devices may be utilized within the scope of the instant invention. The following description of drawings describes some of the preferred embodiments for the practice of the instant invention.

Figure 1:
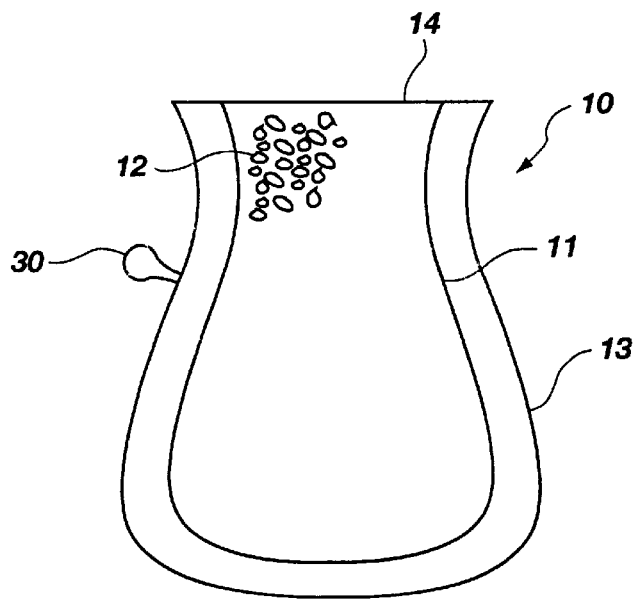
FIG. 1 is an elevational view of a release device formed from a flexible, porous pouch and an outer sealing envelope.

The release device illustrated in FIG. 1 is an interior pouch 11 constructed of a flexible material such as paper, fabric or plastic which is either porous, that is, contains very fine pores, or permeable to the vapors of the sprout inhibitor. Particulate media 12 is contained within the inner pouch 1 and is generally very fine, porous, inorganic particulate matter substantially saturated with a sprout inhibitor which is liquid at room temperature. The inner pouch 11 preferably has pores which are smaller in diameter than the finest particulate media contained within the pouch. An outer pouch or envelope 13 encompasses the inner pouch and provides a vapor barrier to the vapors of the sprout inhibitor. The pouches may be sealed along an upper edge 14. Thus, in the condition shown in FIG. 1, no significant loss of sprout inhibitor vapors would be lost until the outer sealing envelope 13 was breached or removed. The outer sealing envelope 13 may be provided with a tab 30 that is a pull tab which may be yanked upon when the release device is to be put into use to tear the outer envelope 13 so that vapors of the sprout inhibitor may escape during use of the release device.

Preferably, the amount of particulate, porous media and the amount of sprout inhibitor are predetermined for a particular size of package. Generally, it is assumed that a package of potatoes intended for shipment will be temporarily stored and shipped with, perhaps, occasional temporary storage occurring during distribution process. Also, it may be required that the potatoes will need to be protected from sprout inhibition for a period from about two weeks to several months. Thus, the amount of particulate media and sprout inhibitor will be predetermined for the number of pounds of potatoes that are to go into a particular package. As indicated, potatoes are usually packaged in 5, 10 and 25 pounds for consumer use and for commercial use in restaurants, etc., in boxes containing upwards of 40, 50 or more pounds, although usually not in excess of 100 pounds. As indicated hereinabove, the release device may be sized for a particular weight of potatoes or multiple release devices may be used in the larger packages of potatoes.

The release device may contain printed material on it or it may be of a particular color to call attention to a consumer that the release device is to be disposed of and that it is not to be allowed to fall into the hands of children, animals or other beings which could be adversely affected by the particulate media or by the sprout inhibitor. The release device may be constructed with an attachment device where it may be attached to the package for the potatoes, whether it be a plastic, net bag or a cardboard box so that once the potato package is disposed of then the sprout-inhibitor-containing, particulate media is also disposed of.

Generally, silica gel itself is not harmful to humans, animals, etc. and disposal of the release device in which the particulate, porous media is contained even prevents ingestion of the sprout-inhibitor-containing silica gel by birds, rodents and the like which may roam over ultimate garbage disposal sites. Typically, the sprout inhibitor is completely vaporized from the silica gel or other porous, particulate media within about 60 to 90 days so that there would be no long-term potential deleterious effects even to landfill scavengers.

Figure 2:
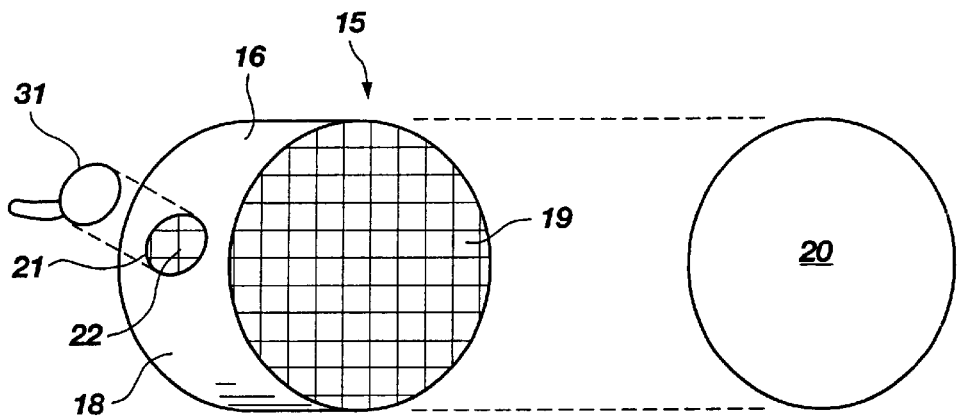
FIG. 2 is a perspective view of a canister-type release device.
Figure 3:
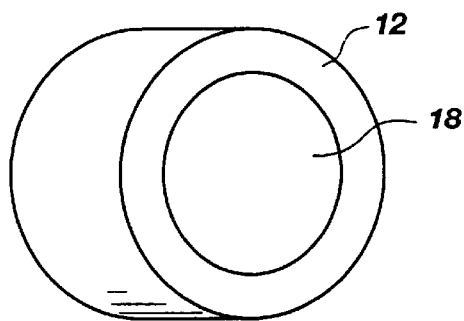
FIG. 3 is a perspective view of the release device of FIG. 2 illustrating an adhesive patch on the reverse side of the device.

Another structure for a release device of the instant invention is illustrated in FIGS. 2 and 3, wherein a small canister 15 is formed from a thin cylinder 16 with a base or bottom 17 and shallow sidewall 18. A mesh material 19 is placed over the open end of the cylinder. The mesh may be a fabric, paper or plastic or other material which has pores sufficiently fine that the particulate, porous media contained within the canister may not readily escape. This particular configuration of release device may be provided with an adhesive material 18 or other attachment means on the reverse side of its base, for example, a pressure sensitive adhesive wherein the canister may be stuck to the potato package, whether it be a cardboard box or flexible bag.

The device illustrated in FIGS. 2 and 3 may have a seal membrane 20 which is placed over the mesh material 19 to confine the vapors within the canister until the device is ready to be used in a package of potatoes. The seal member may be glued to the edges of the cylinder 16 and removed in toto or a tab or another device may be applied so that a slit or rip may be made in the membrane, or the membrane may be cut with a knife or torn by hand to compromise the seal when the device is ready to be used.

It should further be understood that the devices of the instant invention may be made an integral part of any package for potatoes. For example, it could be made as part of a plastic bag or a cardboard box into which potatoes are to be placed for shipment. Devices which are made as an integral part of the potato package then stay with the potato package during its full term of use and during its disposal.

Another variation upon the device illustrated in FIG. 3 would be one where the porous zone or area is on the sidewall of the cylindrical canister rather than at an end of the cylinder. A completely enclosed canister may be made wherein a sidewall has only a small release port covered by fabric material. Such a canister may be made of two cylinders, each with a base and an open end where one cylinder has a diameter sufficiently larger than the other that it fits tightly over the smaller diameter cylinder. The two cylinders may be glued together or otherwise joined and sealed so that sprout inhibitor vapors do not escape. Such a port is illustrated on the sidewall 18 of FIG. 2 as port 21. It may have a mesh or permeable member 22 over it. Thus, the area of the porous member 22 and size and/or number of pores may be predetermined to regulate the escape of the sprout inhibiting vapors from the release device. The number of pores per unit area also affects the release rate of sprout inhibitor. Also, the port 21 could be an alternative to the open face mesh 19 of the device of FIG. 2. The port 21, for example, may be very small, just a few millimeters in diameter, and may be covered with a metal foil seal tab 31, for example, which may be readily removed to initiate the release of sprout inhibitor. As indicated, the size of such port and the size and number of the pores in the containment member may regulate the escape of vapors from the release device. Also, a plurality of sidewall ports or ports in either cylinder base may be provided to provide a greater release rate.

The release devices in the instant invention generally have a preselected quantity of particulate porous or absorptive media and a preselected quantity of sprout inhibitor for a particular size of package or a particular weight of potatoes to be treated. The rate of release of the sprout inhibitor may be controlled from the release device by the size of the port or area of the device covered by a porous member or members. More than one release port may be provided. Also, the size of the pores or the permeability of the media-retaining material may further regulate the rate of release of sprout inhibitor.

It is readily understood that since the packages of potatoes are ventilated, it would not be very effective for all the sprout inhibitor to be released within the first day or two of use, but that the rate of release is to be sufficiently slow that the release of vapors is relatively constant over a period of several weeks to a couple of months. The temperature which the potatoes experience during shipment and intermediate storage will also affect the rate of release; however, it affects release in an advantageous way. Sprouting is more likely to occur and to occur more rapidly at elevated temperatures than at lower temperatures. As the temperature increases, the vapor pressure of the sprout inhibitor increases and the release rate of sprout inhibitor into the package of potatoes will also increase; thus, providing maximum inhibition against sprouting during those periods when sprouting is most likely to occur.

Figure 4:
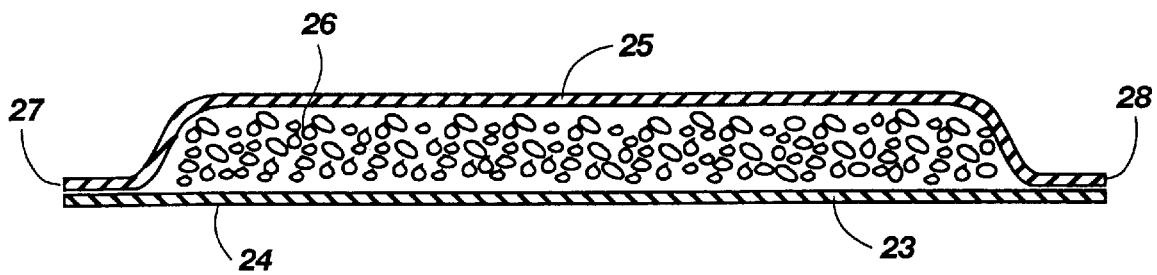
FIG. 4 is an elevational, cross-sectional view of a release device constructed in the form of an adhesive tape sandwich.
Figure 5:
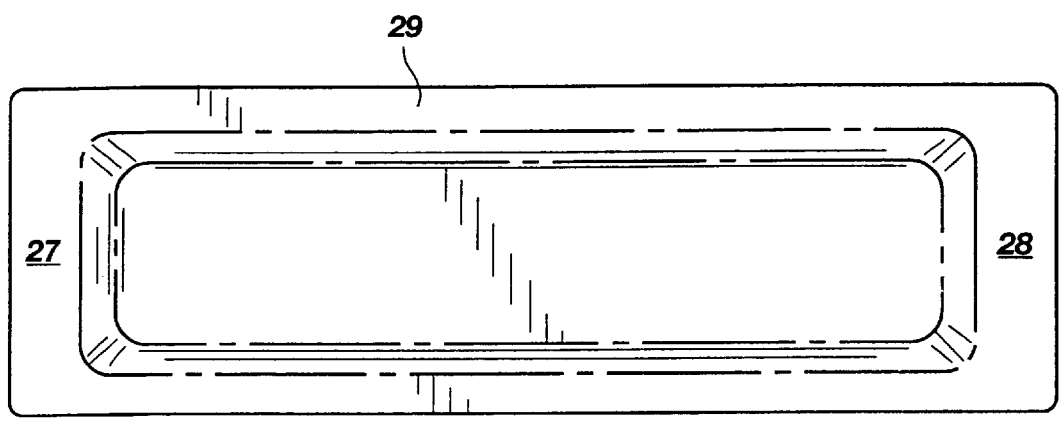
FIG. 5 is a plan view of the release device of FIG. 4.

Another release device structure is illustrated in FIGS. 4 and 5. The release device has a base layer 23 of a paper or cloth tape which has a pressure adhesive or glue surface 24 on its bottom surface. A cloth or paper layer 25 is adhered to the top surface of base layer 23 along the periphery of the base layer to form a pouch or sack containing sprout-inhibitor-treated, particulate media 26. The end portions 27 and 28 of the two layers 23 and 25 are sealed together as well as the side margins 29 and 30.

The top layer 25 may be porous or permeable to sprout inhibitor vapor while retaining the particulate media in the pouch formed by the two layers. Optionally, a barrier or seal layer may be placed over top layer 25 similar to the seal layer on the device of FIG. 3.

The device of FIGS. 4 and 5 could be used on the inside of boxes, for example, to tape the box together while providing sprout inhibiting vapors over an extended period of time, thus performing two useful functions while making the device an integral part of the package.

The device of FIGS. 4 and 5 could be provided in relatively long strips, e.g., over one or two feet in length if necessary. The thickness of the pouch for lengthy devices could be relatively thin, e.g. less than five millimeters or even less than two or three millimeters. The device may also have a width of one to three or more inches as would be convenient for use.

The device of FIGS. 4 and 5 may also be readily used in plastic or mesh bags whereby the adhesive holds the device securely to the inside of the bag. The device of FIG. 4, especially with a thin pouch, would be relatively flexible and not easily dislodged from the inside surface of a flexible-walled bag or other container.

Since the particulate, porous media is in a relatively thin layer in the device of FIG. 4 and the top surface area of layer 25 is large compared to the volume of particulate media, it may be desirable to limit the porosity or permeability of the top layer so the release of sprout inhibitor vapor is relatively slow. The top layer could be constructed of a material impermeable to sprout inhibitor vapor but with a low density (pores/square inch) of minute pores, e.g. pores which are made with a fine needle. Such a porous layer would thus retard rapid release of sprout inhibitor vapors.

A package containing ten pounds of potatoes (approximately 5 kg) can be treated according to the instant invention with about 5 grams of silica gel contacted with 2 grams of 1,4-DMN. The substantially saturated silica gel may be placed in a pouch made of cotton fabric having a tight weave. The weave is sufficiently tight that the minute, generally less than 0.5 mm and often less than 0.2 mm, particles are retained in the fabric pouch.

The potatoes, in a plastic bag with numerous ventilation holes, may be allowed to be in a storage room without air conditioning. A single pouch may be placed in the bag with the potatoes. No significant sprouting occurs after 30 days standing in an unconditioned store room.

The amount of silica gel and sprout inhibitor may vary, depending upon the size, i.e. weight of potatoes, and the amount of free space (voids) in the package and the anticipated time inhibitor is to be required. Generally, it is desirable that the potatoes be tightly confined in a package so that the only free space which exists is the void space caused by the irregular shape of the potatoes.

While 0.2 grams of 1,4-DMN adequately precludes sprouting of one pound (~0.5 kg) of potatoes, smaller amounts may also be adequate. For example, amounts of DMN from about 0.02 gram to about 1.0 gram per pound of potatoes (~0.5 kg) may be effectively used. For various reasons, lower amounts are desirable, consistent with effectiveness for the amount of potatoes, volume of voids, length of residence time of the potatoes in the package and range of temperatures to be experienced.

The amount of porous carrier, e.g. silica gel, may be varied, although the ratio of weight of sprout inhibit carrier to weight of sprout inhibitor should be as low as possible. An advantage of silica gel, for example, is that a large quantity of liquid sprout inhibitor, e.g., 1,4-DMN, can be carried per unit weight of carrier.

The release devices of the instant invention are very advantageous in that a safe, non-toxic sprout inhibitor such as 1,4-DMN is preferably used and the release device may be attached to or made an integral part of the potato-containing package so that sprout inhibition is provided over long periods of time. For example, the devices are safe and effective to preclude sprouting of packaged potatoes long after being purchased by a retail consumer and stored at home in non-temperature regulated environments.

The porous, particulate media are selected to be unreactive with the sprout inhibitor and generally harmless, i.e. non-toxic, to humans, animals, etc. Silica gel is generally preferred because it meets such criteria and can be obtained with various physical characteristics such as particle size, porosity, surface area-to-volume ratios, weights-per-unit volume, etc.

Naturally occurring materials such as porous clays, diatomaceous earth, zeolites and the like are generally inert and non-toxic. However, customizing is generally not possible with naturally occurring material except in a limited manner by crushing, screening, etc.

The use of a mixture of porous media is also contemplated. Porous media with very fine pores generally will release the sprout inhibitor vapors more slowly than particulate media with larger pores. Thus, a mixture of media with larger and smaller pores may be desirable to provide a particular release rate over a given period of time.

The release of sprout inhibitor may be delayed by absorbing another material onto and into the particulate, porous media after the sprout inhibitor. For example, sprout inhibitor treated with silica gel may be exposed to liquid water for example, to cause the water to be absorbed after the sprout inhibitor is absorbed. Thus, the water is first released before the sprout inhibitor. Both treatments of the porous media may be conducted at low temperatures to minimize the vapor pressure of the liquid being adsorbed/absorbed.

Other ingredients may be absorbed/adsorbed after the sprout inhibitor to provide an early, beneficial effect to the packaged potatoes or to provide a delayed release of the sprout inhibitor.

Silica gel is amorphous silica derived from silica acid which has been dehydrated to form fine, porous particles. It has a density of about 38–40 lbs/ft$^3$ and an average porosity of about 50–65%. The surface area is about $6 \times 10^6$ cm$^2$/gm with an average pore diameter of $4 \times 10^{-7}$ cm. Generally, water adsorption is 40% on a dry weight basis. This is about twice that is available via alumina, which is generally less porous and with a significantly higher density.

Silica gel is available in various mesh sizes from +8 mesh to +325 mesh, i.e. from about 2.4 mm to about 0.07 mm.

Diatomaceous earth is also an advantageous material in that it has a specific gravity of about 0.24 to about 0.3 and the ability to absorb several times its weight of water.

Thus, both silica gel and diatomaceous earth have the ability to absorb large amounts of liquid sprout inhibitor, especially 1,4-DMN and may be very effectively used in the instant invention.

The liquid sprout inhibitor may be absorbed by porous particulate media by soaking the media in the liquid or by exposing cool media to vapor of the sprout inhibitor so that the vapors condense inside the media.

Other techniques which may be utilized in addition to or instead of the slow released device described hereinabove include the following systems and techniques.

Porous media which has been soaked with DMN, for example, to be absorbed on and within the porous media, may be coated with various types of transitory coatings which may be porous or non-porous. Such coatings may regulate the release of the DMN from the porous media. For example, a lumina silica gel, paper and other porous media, containing DMN, or substituted naphthalenes generally, including various isomers of DMN and other substituted naphthalenes such as DIPN, (isopropyl naphthalene), MMN (monomethyl naphthalene) and the like, may be coated with a polymer, such as polyvinyl alcohol, which is generally degraded by moisture. Thus, porous media containing a substituted naphthalene when having a polyvinyl alcohol (PVA) coating may be stored for extensive periods of time in dry conditions and then when it is desired for use, such porous media containing, for example, 1-4,DMN, the most effective sprout suppressant of the DMN isomers, may then be placed among potatoes to be treated for sprout suppression wherein high moisture conditions are prevalent. For example, in storage facilities for potatoes, the potatoes are generally stored at 40°–50° F. or thereabouts with humidity conditions above 80% and generally in the range of 90%–95%. Over time the polyvinyl alcohol will dissolve in such humid conditions and the DMN will then slowly escape to treat the potatoes with DMN.

While polyvinyl alcohol was a known polymer which degrades in the presence of water, there are also other degradable coatings that may be utilized. The porous and/or degradable coating is integral with the porous media so that the media may be handled as usual.

This type of release system can be used with other pesticides and the like, including herbicides, fungicides, and the like, to treat potatoes or other vegetables that are stored, especially when the storage conditions are under humid conditions.

Another system for treating potatoes or other vegetables with sprout suppressants, fungicides, herbicides, and the like, employs canisters which are charged with an approved propellent and the desired pesticide, herbicide, etc., including sprout suppressants, such as substituted naphthalenes, particularly DMN isomers and, more particularly, the 1-4 isomer, wherein the canister may be triggered to either rapidly release or slowly release the herbicide, pesticide, etc. into the atmosphere around the vegetables or fruits being stored. This system is particularly useful whenever potatoes are shipped, for example, from a storage facility to a warehouse or to a retail store wherein a truck or boxcar may be loaded with boxes or bags of potatoes and it is desired to maintain a sprout suppressant atmosphere around the potatoes during storage so sprouting does not occur in transit. DMN, for example, may be absorbed by the potatoes so that the sprout suppressant characteristics will be retained even into the home of a consumer so that sprouting does not occur before the potatoes are used.

Another system for treating potatoes, either in storage or in transit in trucks or boxcars and the like, include a porous media, such as paper, cardboard, or other fibrous media, for example, cellulosic material, wherein a card, for example, may be formed of such material and the sprout suppressant, preferably a liquid substituted naphthalene and especially isomers of DMN, may be printed or painted upon such a porous card. The card could then be dropped into a bag or box as potatoes are being loaded into the box or bag. It could be actually part of the process by which the potatoes are boxed or bagged, for example, in a potato sorting facility just prior to the potatoes being dropped from a hopper into a box, a machine can be set up alongside and cards are then sprayed with, for example, 1,4-DMN, and as the potatoes are dropped into the bag or box, the card could also be discharged into the bag or box so that the appropriate amount of DMN would be present during shipment of said bag or box to suppress the sprouting of the potatoes during shipment, during display on retail shelves and storage at the home of the consumer.

This invention is particularly useful inasmuch as there are ink jet printers that have the capability of even printing graphic designs or letters or other indicia upon a card, for example, or the interior of a box in which potatoes are being stored. The printing could indicate that DMN, for example, is present and that the card should not be permitted to be eaten or licked by children, etc. Also, the indicia could indicate the source of the potatoes, the source of the card and treatment, or other information.

It is advantageous that DMN, for example, is a good solvent and inks or very fine pigments or the like could be added to the DMN as a coloring agent so that even though the DMN evaporates ultimately from the card or other media on which this is sprayed, the coloring would remain to indicate that a sprout suppressant had been present on the card.

In the event it was desired to preprint cards of this sort using an ink jet printer or the like, a non-porous tape substantially impermeable to DMN could be taped over the printed card as soon as the ink had sufficiently dried to keep the DMN from evaporating from the card. The card could be enclosed in a double-tape system, wherein both the back and front of the card were taped and then when the card was ready for use, the tape could be pulled off and the card then placed in a bag or box of potatoes.

Also, the tape could be a polyvinyl acetate or polyvinyl alcohol tape or similar tape which degrades upon exposure to moisture so that the tape could be present and then degrade during shipment and the like so that the DMN would be able to evaporate from the card and treat potatoes in transit, for example.

In its latest described embodiment of the invention, a substrate, particularly a porous substrate, having some capability of absorbing substituted naphthalene, especially an isomer of DMN, may be utilized either for the boxes containing potatoes or for a card. The card may include small cards the size of a credit card or it may be a much larger structure with more printed material and more surface area so that sufficient DMN may be absorbed, for example, that it may be released to control sprouting in larger boxes of potatoes.

The porous substrate may contain a sufficient quantity of DMN such that when said porous substrate is part of a package for potatoes as is placed into a package of potatoes, the DMN present is sufficient to suppress sprouting of the potatoes for a limited period of time, e.g., several weeks to a month or more, which time period is generally more than is required for the shipment of potatoes from a storage facility to a retail establishment and to a consumers shelf at home.

What is claimed is:

1. A release device for releasing vapor of a sprout suppressant into a package of potatoes during shipment or storage comprising:

a quantity of porous media containing a potato sprout inhibitor; and containment means for said porous media, said containment means being at least partially porous to the vapor of said sprout inhibitor.

2. The release device of claim 1, wherein a removable or breachable seal means structured to seal at least the porous portion of said containment means to prevent loss of sprout inhibitor vapor while said seal is in a sealing position; said seal material being structured to be hand-removable or hand-breachable.

3. The release device of claim 1, wherein said porous media is a fine, particulate inorganic material.

4. The release device of claim 1, wherein the containment means is integral with said porous media.

5. A release device for releasing a vapor of a substituted naphthalene into a quantity of harvested potatoes comprising:

a paper-like media containing said substituted naphthalene.

6. The release device of claim 5, wherein a portion of said paper-like media contains said substituted naphthalene.

7. A porous substrate for use with a package of potatoes, said porous substrate containing a substituted naphthalene in an amount sufficient to suppress sprouting of said potatoes for a limited period of time.

8. A method of inhibiting sprouts on potatoes comprising:

providing a release device for releasing vapor of a sprout suppressant into a package of potatoes during shipment or storage, said release device comprising a quantity of porous media containing a potato sprout inhibitor and containment means for said porous media, wherein said containment means being at least partially porous to the vapor of said sprout inhibitor; and introducing said release device into a package of potatoes.

9. The method of claim 8, wherein providing a release device comprises providing a removable or breachable seal means structured to seal at least the porous portion of said containment means to prevent loss of sprout inhibitor vapor while said seal is in a sealing position, said seal material being structured to be hand-removable or hand-breachable.

10. The method of claim 8, wherein providing a release device comprises providing a porous media consisting of fine, particulate inorganic material.

11. The method of claim 8, wherein providing a release device comprises providing a release device having a containment means that is integral with said porous media.

12. The method of claim 8, wherein providing a release device comprises providing a paper-like media containing said substituted naphthalene.

13. The method of claim 12, wherein providing a a paper-like media comprises providing a portion of said paper-like media containing said substituted naphthalene.

* * * * *

UNITED STATES PATENT AND TRADEMARK OFFICE
CERTIFICATE OF CORRECTION

PATENT NO.    : 6,338,296 B1
DATED         : January 15, 2001
INVENTOR(S)   : Darol Forsythe and John N. Forsythe It is certified that error appears in the above-identified patent and that said Letters Patent is hereby corrected as shown below:

Drawings,
Figure 3, change numeral "12" to -- 16 -- as shown below:

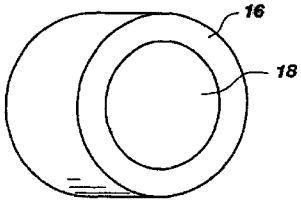

Fig. 3

Column 4,
Line 66, after "device" insert -- 10 --

Column 5,
Line 3, change "1" to -- 11 --

Column 6,
Line 1, after "adhesive material" delete "18"

Column 7,
Line 18, after "29" delete "and 30"

Signed and Sealed this

Twenty-third Day of September, 2003

JAMES E. ROGAN
*Director of the United States Patent and Trademark Office*